(12) United States Patent
Cheng et al.

(10) Patent No.: US 9,552,833 B2
(45) Date of Patent: *Jan. 24, 2017

(54) DEVICES INCLUDING A MULTILAYER GAS BARRIER LAYER

(71) Applicant: SEAGATE TECHNOLOGY LLC, Cupertino, CA (US)

(72) Inventors: Yuhang Cheng, Edina, MN (US); Kurt W. Wierman, Eden Prairie, MN (US); Michael Seigler, Eden Prairie, MN (US); Scott Franzen, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,694

(22) Filed: Oct. 21, 2015

(65) Prior Publication Data
US 2016/0133278 A1 May 12, 2016

Related U.S. Application Data

(60) Provisional application No. 62/078,112, filed on Nov. 11, 2014.

(51) Int. Cl.
G11B 11/00 (2006.01)
G11B 5/31 (2006.01)
G11B 5/00 (2006.01)

(52) U.S. Cl.
CPC .............. *G11B 5/314* (2013.01); *G11B 5/3106* (2013.01); *G11B 5/3136* (2013.01); *G11B 2005/0021* (2013.01)

(58) Field of Classification Search
None
See application file for complete search history.

(56) References Cited

U.S. PATENT DOCUMENTS

| 4,492,873 | A | 1/1985 | Dmitriev |
| 5,482,611 | A | 1/1996 | Helmer |
| 5,849,093 | A | 12/1998 | Andra |

(Continued)

FOREIGN PATENT DOCUMENTS

| EP | 024088 | 10/1987 |
| EP | 0 580 368 A2 | 1/1994 |

(Continued)

OTHER PUBLICATIONS

U.S. Appl. No. 13/923,925, filed Jun. 21, 2013, Pitcher.

(Continued)

*Primary Examiner* — Peter Vincent Agustin
(74) *Attorney, Agent, or Firm* — Mueting, Raasch & Gebhardt, P.A.

(57) ABSTRACT

Devices that include a near field transducer (NFT); a multilayer gas barrier layer positioned on at least a portion of the NFT, the multilayer gas barrier layer including at least a first and a second sublayer, where the second gas barrier sublayer is positioned on the first gas barrier sublayer, the first gas barrier sublayer is positioned adjacent the NFT and the second gas barrier sublayer is positioned adjacent the wear resistant layer, the first and second sublayers independently have thicknesses from 0.01 nm to 5 nm; and a wear resistance layer positioned on at least a portion of the gas barrier layer.

20 Claims, 4 Drawing Sheets

(56) References Cited

U.S. PATENT DOCUMENTS

| | | | |
|---|---|---|---|
| 5,945,681 A | 8/1999 | Tokiguchi | |
| 6,130,436 A | 10/2000 | Renau | |
| 6,144,098 A | 11/2000 | Iyer | |
| 6,304,527 B1* | 10/2001 | Ito | B82Y 20/00 |
| | | | 369/112.01 |
| 6,589,676 B1 | 7/2003 | Gui | |
| 6,632,483 B1 | 10/2003 | Callegari | |
| 6,641,932 B1 | 11/2003 | Xu | |
| 6,683,426 B1 | 1/2004 | Kleeven | |
| 6,839,306 B1* | 1/2005 | Hajjar | G11B 7/0938 |
| | | | 369/13.33 |
| 7,018,729 B2 | 3/2006 | Pocker | |
| 7,377,228 B2 | 5/2008 | Mack | |
| 7,476,855 B2 | 1/2009 | Huang | |
| 8,040,761 B2 | 10/2011 | Kawamori | |
| 8,351,151 B2 | 1/2013 | Katine | |
| 8,400,902 B2 | 3/2013 | Huang | |
| 8,427,925 B2 | 4/2013 | Zhao | |
| 8,830,800 B1 | 9/2014 | Pitcher | |
| 8,867,322 B1* | 10/2014 | Chernyshov | G11B 5/7325 |
| | | | 360/131 |
| 8,902,720 B1* | 12/2014 | Schreck | G11B 5/3106 |
| | | | 369/112.27 |
| 8,923,100 B1* | 12/2014 | Wessel | G11B 5/6088 |
| | | | 369/112.27 |
| 2005/0012052 A1 | 1/2005 | Platzgummer | |
| 2006/0238133 A1 | 10/2006 | Horsky | |
| 2008/0230724 A1 | 9/2008 | Low | |
| 2010/0123965 A1 | 5/2010 | Lee | |
| 2010/0123967 A1 | 5/2010 | Batra | |
| 2010/0190036 A1 | 7/2010 | Komvopoulos | |
| 2010/0320403 A1 | 12/2010 | Amaldi | |
| 2010/0329085 A1 | 12/2010 | Kawamori | |
| 2011/0006214 A1 | 1/2011 | Bonig | |
| 2011/0026161 A1 | 2/2011 | Ikeda | |
| 2011/0096431 A1 | 4/2011 | Hellwig | |
| 2011/0205863 A1* | 8/2011 | Zhao | B82Y 10/00 |
| | | | 369/13.33 |
| 2012/0105996 A1* | 5/2012 | Katine | G11B 5/314 |
| | | | 360/59 |
| 2013/0107679 A1* | 5/2013 | Huang | G11B 13/08 |
| | | | 369/13.32 |
| 2013/0161505 A1 | 6/2013 | Pitcher | |
| 2013/0164453 A1 | 6/2013 | Pitcher | |
| 2013/0164454 A1 | 6/2013 | Pitcher | |
| 2013/0288077 A1 | 10/2013 | Dhawam | |
| 2014/0004384 A1 | 1/2014 | Zhao | |
| 2014/0113160 A1 | 4/2014 | Pitcher | |
| 2014/0160914 A1* | 6/2014 | Shiono | G11B 7/24065 |
| | | | 369/110.01 |
| 2014/0313872 A1 | 10/2014 | Rawat | |
| 2014/0376348 A1 | 12/2014 | Cheng | |
| 2014/0376349 A1 | 12/2014 | Cheng | |
| 2014/0376350 A1* | 12/2014 | Cheng | G11B 5/4866 |
| | | | 369/13.33 |
| 2015/0054113 A1* | 2/2015 | Suzuki | H01L 27/14638 |
| | | | 257/459 |
| 2015/0069556 A1* | 3/2015 | Yamakawa | H01L 43/02 |
| | | | 257/421 |
| 2015/0116090 A1* | 4/2015 | Proehl | H04B 5/0037 |
| | | | 340/10.1 |
| 2015/0318003 A1* | 11/2015 | Cheng | G11B 5/313 |
| | | | 216/24 |

FOREIGN PATENT DOCUMENTS

| | | |
|---|---|---|
| EP | 0942072 | 9/1999 |
| EP | 1328027 | 7/2003 |
| EP | 2106678 | 10/2008 |
| WO | WO 97/45834 | 12/1997 |
| WO | WO 2013/163195 | 10/2013 |
| WO | WO 2013/163470 | 10/2013 |

OTHER PUBLICATIONS

U.S. Appl. No. 14/062,651, filed Oct. 24, 2013, Zou.
U.S. Appl. No. 14/531,455, filed Nov. 3, 2014, Huang.
U.S. Appl. No. 14/535,529, filed Nov. 7, 2014, Huang.
U.S. Appl. No. 14/535,527, filed Nov. 7, 2014, Huang.
Al-Bayati et al., Junction Profiles of Sub keV Ion Implantation for Deep Sub-Quarter Micron Devices, *IEEE*, 2000, pp. 87-90.
Angel et al., "Enhanced Low Energy Drift-Mode Beam Currents in a High Current Ion Implanter," *IEEE*, 1999, pp. 219-222.
Druz et al., "Diamond-Like Carbon Films Deposited Using a Broad, Uniform Ion Beam from an RF Inductively Coupled CH4-Plasma Source", Diamond and Related Materials, vol. 7, No. 7, Jul. 1998, pp. 965-972.
Liu et al., "Influence of the Incident Angle of Energetic Carbon Ions on the Properties of Tetrahedral Amorphous Carbon (ta-C) films", *Journal of Vacuum Science and Technology*, vol. 21, No. 5, Jul. 25, 2003, pp. 1665-1670.
Metallization: "Metallization"; chapter 5", In: *Kris v. Srikrishnan and Geraldine C. Schwartz*:" Handbook of Semiconductor Interconnection Technology, Second Edition, 2006, CRC Press, Boca Raton, FL, USA, XP002711255, ISBN:978-1-4200-1765-6, pp. 311-382, Section 5.4.1.2 Adhesion; p. 320.
Piazza et al., "Large Area Deposition of Hydrogenated Amorphous Carbon Films for Optical Storage Disks", Diamond and Related Materials, vol. 13, No. 4-8, Apr. 2004, pp. 1505-1510.
Robertson, J., "Diamond-Like Amorphous Carbon," *Materials Science and Engineering R 37*, 2002, pp. 129-281.
Satoh et al., "Evaluation of Adhesion Materials for Gold Line-and-Space Surface Plasmon Antenna on SO1-MOS Photodiode", Silicon Nanoelectronics Workshop (SNW), 2010, *IEEE*, Piscataway, NJ, USA, Jun. 13, 2010, pp. 1-2.
Vogt, K.W. et al., "Characterization of Thin Titanium Oxide Adhesion Layers on Gold Resistivity, Morphology, and Composition", *Surface Science*, North-Holland, Amsterdam, NL, vol. 301, No. 1-3, Jan. 10, 1994, pp. 203-213.

\* cited by examiner

DEVICES INCLUDING A MULTILAYER GAS BARRIER LAYER

PRIORITY

This application claims priority to U.S. Provisional Application No. 62/078,112 entitled, NEAR FIELD TRANSDUCER WITH GAS BARRIER LAYER, filed on Nov. 11, 2014, the disclosure of which is incorporated herein by reference thereto.

SUMMARY

Disclosed are devices that include a near field transducer (NFT); a multilayer gas barrier layer positioned on at least a portion of the NFT, the multilayer gas barrier layer including at least a first and a second sublayer, where the second gas barrier sublayer is positioned on the first gas barrier sublayer, the first gas barrier sublayer is positioned adjacent the NFT and the second gas barrier sublayer is positioned adjacent the wear resistant layer, the first and second sublayers independently have thicknesses from 0.01 nm to 5 nm; and a wear resistance layer positioned on at least a portion of the gas barrier layer.

Also disclosed are devices that include a near field transducer (NFT); a multilayer gas barrier layer positioned on at least a portion of the NFT, the multilayer gas barrier layer including at least a first and a second sublayer, where the second gas barrier sublayer is positioned on the first gas barrier sublayer, the first gas barrier sublayer is positioned adjacent the NFT and the second gas barrier sublayer is positioned adjacent the wear resistant layer, the first and second sublayers independently include a fluoride or a metal; and a wear resistance layer positioned on at least a portion of the gas barrier layer.

Also disclosed are devices that include a near field transducer (NFT); a multilayer gas barrier layer positioned on at least a portion of the NFT, the multilayer gas barrier layer including at least a first and a second sublayer, where the second gas barrier sublayer is positioned on the first gas barrier sublayer, the first gas barrier sublayer is positioned adjacent the NFT and the second gas barrier sublayer is positioned adjacent the wear resistant layer, the first and second sublayers independently include a fluoride or a metal; a wear resistance layer positioned on at least a portion of the gas barrier layer; and a NFT adhesion layer positioned between the multilayer gas barrier layer and the NFT.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

The high temperatures that the NFT and surrounding structures reach during operation can lead to oxidation, corrosion, or both of the write pole. In addition, the high temperatures can cause adhesion layers over the peg to oxidize, which can lead to the peg separated from surrounding structures, including the overcoat layer disposed thereon. Ultimately, these processes can lead to peg deformation and recession, pole oxidation, pole protrusion, and damage of the overcoat layer for example. All of these effects can also reduce the magnetic field delivered to the media thereby affecting writing to the media.

One of the major defects in thin films is pin holes. Reactive gases or water vapors from the working environment could diffuse through pin holes and reach the substrate surface, causing oxidation and corrosion of the substrate. To prevent or minimize the formation of through coating pin holes, a multiple layer gas barrier layer is utilized herein. Although new pin holes may be formed, they will almost certainly be formed at different locations and won't provide a pathway through the gas barrier layer. As such, a multilayer gas barrier layer can effectively block the diffusion of reactive gases or water vapors and improve the gas barrier property.

Previously utilized gas barrier layers were typically ceramic layers with high hardness, but low fracture toughness. During operation of HAMR heads, laser induced thermal stress would cause breaking or spalling of the head overcoat (HOC) from the substrate. Disclosed devices may improve fracture toughness of the HOC by utilizing a multilayer gas barrier layer. This could be due to the interfaces between different layers deflecting cracking directions, which increases the energy needed for crack propagation, and therefore, increase coating fracture toughness. Disclosed multilayer gas barrier layers may therefore provide a gas barrier layer with improved toughness.

Disclosed devices include a multilayer gas barrier layer adjacent to a wear resistant layer over at least a peg region of a NFT of a magnetic head. The multilayer gas barrier layer may function to improve gas barrier properties of the overall structure over the head. The multilayer gas barrier layer can be considered part of an overcoat structure or can be considered a separate layer or structure that functions cooperatively with the overcoat structure.

Figure 1:
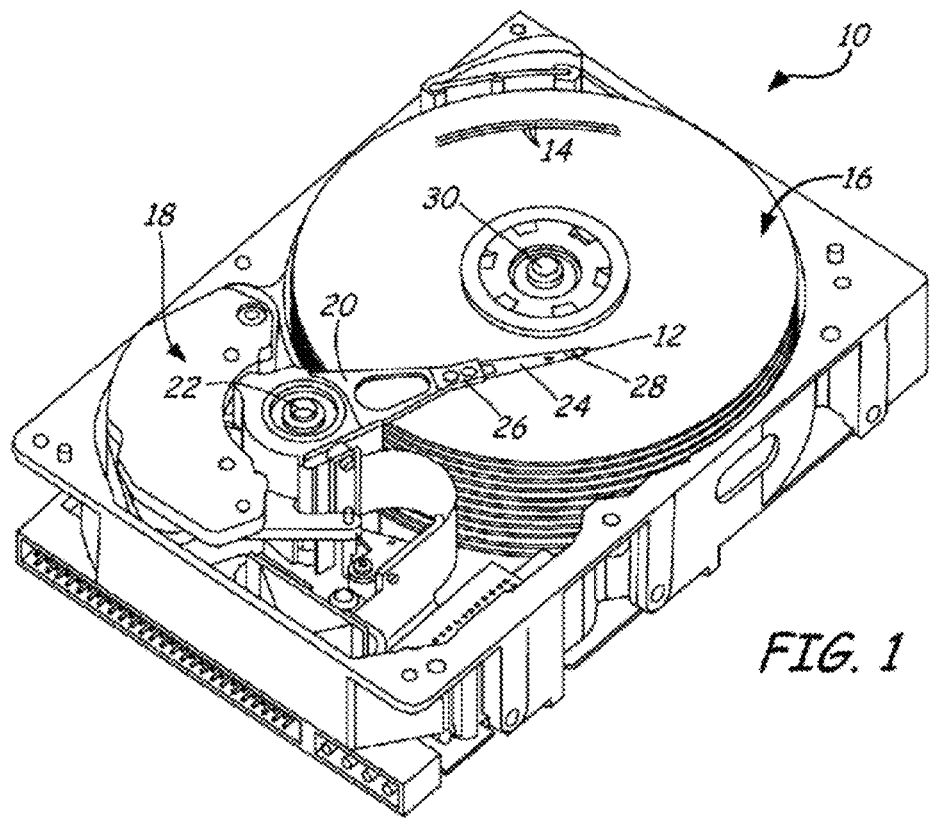
FIG. 1 is a perspective view of a magnetic disc drive that can include HAMR devices.

FIG. 1 is a perspective view of disc drive 10 including an actuation system for positioning slider 12 over track 14 of magnetic medium 16. The system depicted in FIGS. 1 and 2 can include disclosed structures and multilayer gas barrier layers. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
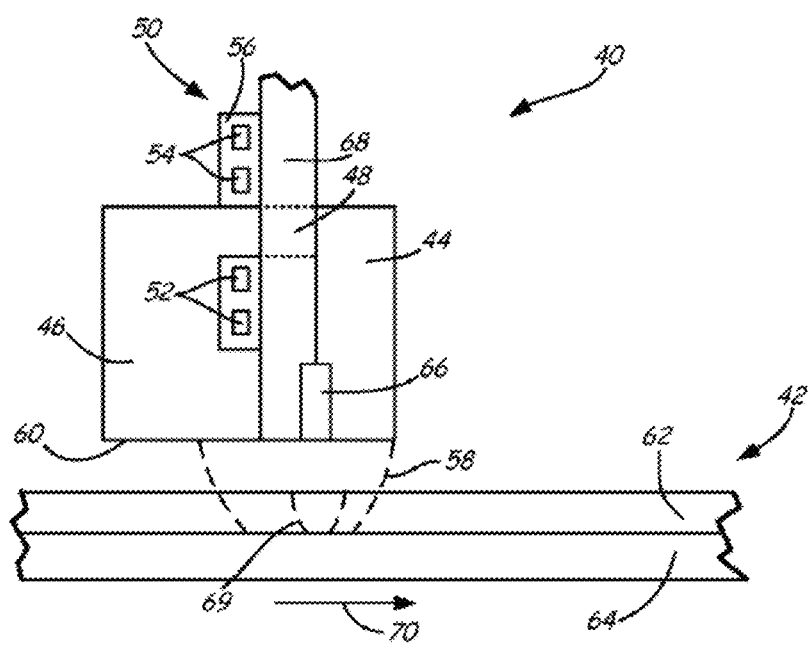
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium. As can be seen in FIG. 2, a portion of the near field transducer is positioned at the ABS 60 of the device.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIGS. 1 and 2.

Figure 3A:
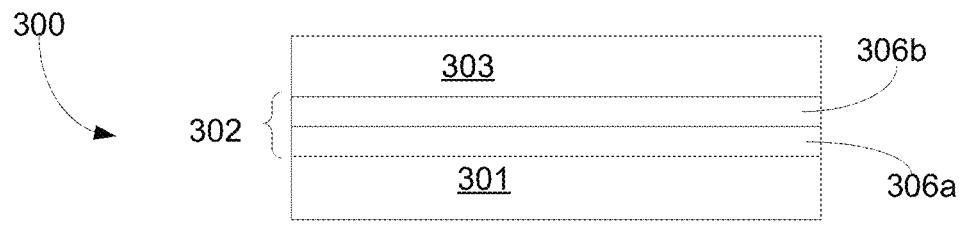
FIGS. 3A, 3B, 3C, and 3D are cross sectional views of devices that include disclosed multilayer gas barrier layers.

FIG. 3A depicts a cross section of a portion of a device 300 that includes a multilayer gas barrier layer 302 positioned between a substrate 301 and a wear resistant layer 303. The multilayer gas barrier layer 302 includes at least a first gas barrier sublayer 306a and a second gas barrier sublayer 306b. It should also be understood that any number of layers could be included in a multilayer gas barrier layer. For example, three layers could be included, in which case they could be referred to as the first sublayer, the second sublayer and the third sublayer for example.

The first gas barrier sublayer 306a may be of the same or a different material than that of the second gas barrier sublayer 306b. In some embodiments, the first gas barrier sublayer 306a can be of a first material and the second gas barrier sublayer 306b may also be of the first material. In some embodiments, the first gas barrier sublayer 306a can be of a first material and the second gas barrier sublayer 306b may be of a second material. The first gas barrier sublayer 306a and the second gas barrier sublayer 306b need not, but may have substantially the same thickness. The first gas barrier sublayer 306a and the second gas barrier sublayer 306b may also include the same components, but at different amounts. The first gas barrier sublayer 306a and the second gas barrier sublayer 306b may also have different microstructure, different crystalline structure, different mechanical properties (e.g., hardness, toughness, wear resistance), different optical properties (e.g., refractive index and optical absorption), or any combination thereof.

Multilayer gas barrier layers can function to diminish the amount or entirely prevent gases from reaching or contacting layers or structures located below the multilayer gas barrier layer. In some embodiments, a multilayer gas barrier layer can function to diminish the amount or entirely prevent gases from reaching the write pole, the heat skin, the magnetic reader, the NFT (e.g., the peg, disc, or both), or any combination thereof. In some embodiments, a multilayer gas barrier layer can function to diminish the amount or entirely prevent gases from reaching the write pole, the NFT (e.g., the peg, disc or both), or any combination thereof. In some embodiments, a multilayer gas barrier layer can function to diminish the amount or entirely prevent gases from reaching the write pole and the peg of the NFT.

In some embodiments, a single set of sublayers can include a first sublayer having a first set of properties and a second sublayer having a second set of properties. In some embodiments, a first sublayer can differ from a second sublayer in one or more than one property (e.g., material, compositional gradient, thickness, refractive index, optical absorption, internal stress, density, grain size, crystalline structure, lattice constant, physical properties, chemical properties, or corrosion resistance). In some embodiments each set of sublayers can be positioned in the same way, for example, within each set of sublayers, a first sublayer is positioned closer to the substrate than the second sublayer. The configuration of the sets of sublayers can be described as alternating.

Each sublayer of a multilayer gas barrier layer can have various thicknesses. In some embodiments, each sublayer can have thicknesses of not less than 0.01 nm, or in some embodiments not less than 0.1 nm. In some embodiments, each sublayer can have thickness of not greater than 10 nm, in some embodiments not greater than 5 nm, or in some embodiments not greater than 2 nm.

In some embodiments, each sublayer of a multilayer gas barrier layer can independently include oxides, nitrides, carbides, silicides, borides, fluorides, metals, or combinations thereof (e.g., oxynitrides) for example.

In some embodiments, each sublayer of a multilayer gas barrier layer can independently include diamond like carbon (DLC) or nanocomposite DLC for example.

In some embodiments, each sublayer of a multilayer gas barrier layer can independently include oxides such as tantalum oxide (TaO), chromium oxide (CrO), silicon oxide (SiO), aluminum oxide (AlO), titanium oxide (TiO), zirconium oxide (ZrO), niobioum oxide (NbO), hafnium oxide (HfO), or some combination thereof. In some embodiments, each sublayer of a multilayer gas barrier layer can independently include tantalum oxide (TaO), chromium oxide (CrO), or combinations thereof. Illustrative combinations of such oxides can include, for example aluminum silicon oxide (AlSiO), titanium silicon oxide (TiSiO), titanium aluminum oxide (TiAlO), tantalum aluminum oxide (TaAlO), tantalum silicon oxide (TaSiO), and titanium aluminum silicon oxide (TiAlSiO). In some embodiments, each sublayer of a multilayer gas barrier layer can independently include one or more of titanium aluminum oxide (TiAlO), tantalum aluminum oxide (TaAlO), tantalum silicon oxide (TaSiO), and titanium aluminum silicon oxide (TiAlSiO), for example. It should be noted that oxides can include any stoichiometry including the particular noted element and oxygen.

In some embodiments, each sublayer of a multilayer gas barrier layer can independently include nitrides such as silicon nitride (SiN), aluminum nitride (AlN), boron nitride (BN), titanium nitride (TiN), zirconium nitride (ZrN), niobioum nitride (NbN), hafnium nitride (HfN), chromium nitride (CrN), tantalum nitride (TaN), or combinations thereof. In some embodiments, each sublayer of a multilayer gas barrier layer can independently include aluminum nitride (AlN), tantalum nitride (TaN), or some combination thereof. Illustrative combinations of nitrides can include, for example titanium aluminum nitride (TiAlN), titanium silicon nitride (TiSiN), aluminum silicon nitride (AlSiN), tantalum silicon nitride (TaSiN), tantalum aluminum nitride (TaAlN), carbon silicon nitride (CSiN), titanium aluminum silicon nitride (TiAlSiN), or combinations thereof.

In some embodiments, each sublayer of a multilayer gas barrier layer can include borides such as titanium boride (TiB$_2$), chromium boride (CrB), zirconium boride (ZrB$_2$), or combinations thereof.

In some embodiments, each sublayer of a multilayer gas barrier layer can include fluorides. Fluorides may be useful because typically, fluorides have a relatively low refractive index, which could be helpful because of the optical properties that are desirable in portions overlying the NFT. Illustrative fluorides could include chromium fluoride (CrF$_2$), magnesium fluoride (MgF$_2$), silicon fluoride (SiF), or combinations thereof.

In some embodiments, each sublayer of a multilayer gas barrier layer can include carbides such as titanium carbide (TiC), zirconium carbide (ZrC), chromium carbide (CrC), silicon carbide (SiC), boron carbide (BC), or combinations thereof. In some embodiments, each sublayer of a multilayer gas barrier layer can include silicides, such as titanium silicide (TiSi2), zirconium silicide (ZrSi2), molybdenum silicide (MoSi2), tantalum silicide (TaSi2), tungsten silicide (WSi2), vanadium silicide (VSi), silicon carbide (SiC), or combinations thereof.

In some embodiments, mixtures of oxides and nitrides (for example) can be utilized in sublayers of multilayer gas barrier layers. Illustrative examples of such materials include silicon oxy nitride (SiON), aluminum oxy nitride (AlON), titanium oxy nitride (TiON), zirconium oxy nitride (ZrON), chromium oxy nitride (CrON), niobioum oxy nitride (NbON), hafnium oxy nitride (HfON), tantalum oxy nitride (TaON), or combinations thereof, for example. In some embodiments, each sublayer of a multilayer gas barrier layer can include tantalum oxy nitride (TaON), for example. Examples of combination oxy nitrides can include, for example silicon aluminum oxy nitride (SiAlON), titanium silicon oxy nitride (TiSiON), titanium aluminum silicon oxy nitride (TiAlSiON), tantalum silicon oxy nitride (TaSiON), titanium aluminum oxy nitride (TiAlON), and tantalum aluminum oxy nitride (TaAlON). In some embodiments, mixtures of carbides and nitrides (for example) can be utilized. Illustrative examples of such materials include carbon silicon nitride (CSiN), for example.

In some embodiments, each sublayer of a multilayer gas barrier layer can independently include diamond like carbon (DLC). In some embodiments, the DLC could contain other elements such as silicon (Si), nitrogen (N), boron (B), or other metallic elements.

In some embodiments, each sublayer of a multilayer gas barrier layer can independently include metals such as titanium (Ti), chromium (Cr), niobium (Nb), hafnium (Hf), nickel (Ni), zirconium (Zr), tungsten (W), ruthenium (Ru), iridium (Ir), molybdenum (Mo), or combinations thereof.

In some embodiments, sublayers including oxides can be made by depositing a metal layer and then oxidizing the metal layer. Oxidation of the metal layer can be accomplished using various processes, including thermal oxidation, and plasma oxidation processes, for example. The oxidation process effectively adds oxygen atoms into the metallic layer, which can cause expansion of the metal lattice. Expansion of the metal lattice can reduce the defect density of the metal layer (e.g., vacancies, grain boundaries, dislocations, and pin holes) or a sublayer of a gas barrier layer formed thereby. Such effects could serve to increase corrosion resistance of the overall device. In some embodiments, sublayers of gas barrier layers including oxides can also be formed by sputtering (for example) from an oxide target. In some embodiments, gas barrier layers can be formed by sputtering (for example) from an oxide target in an oxygen rich environment. In some embodiments, gas barrier layers can be formed by sputtering a metal and subsequently oxidizing or at least partially oxidizing the deposited metal. In some embodiments, gas barrier layers including oxides can also be formed using atomic layer deposition (ALD) for example.

In some embodiments, sublayers of gas barrier layers can be made using a process that includes a delay between depositions. A delay between the depositions (whether the materials are made of the same material or different) could further minimize or even prevent the formation of pin holes that traverse the entire span of the gas barrier layer. Incorporation of a time delay during plasma deposition (for example) may function to facilitate re-nucleation of the material of the just deposited sublayer before the next sublayer is deposited thereon. In some embodiments, a time delay of at least 0.1 seconds can be utilized between deposition steps. In some embodiments, a time delay of not greater than 30 minutes can be utilized between deposition steps.

Figure 3B:
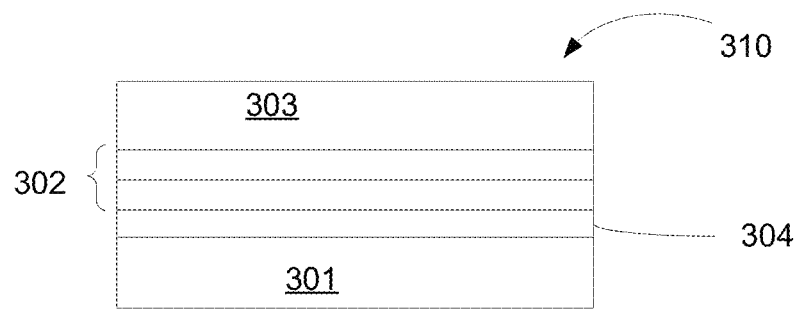

FIG. 3B depicts another illustrative device 310 that includes a substrate 301, a multilayer gas barrier layer 302 and a wear resistant layer 303, configured as described in FIG. 3A. The device 310 also includes an optional substrate adhesion layer 304. The optional substrate adhesion layer 304 can be positioned between the substrate 301 and the multilayer gas barrier layer 302. The optional substrate adhesion layer 304 can function to improve the adhesion between the multilayer gas barrier layer 302 and the substrate 301. Properties of the substrate adhesion layer 304 can depend, at least in part, on the materials of the overlying multilayer gas barrier layer 302 and the underlying substrate 301.

Figure 3C:
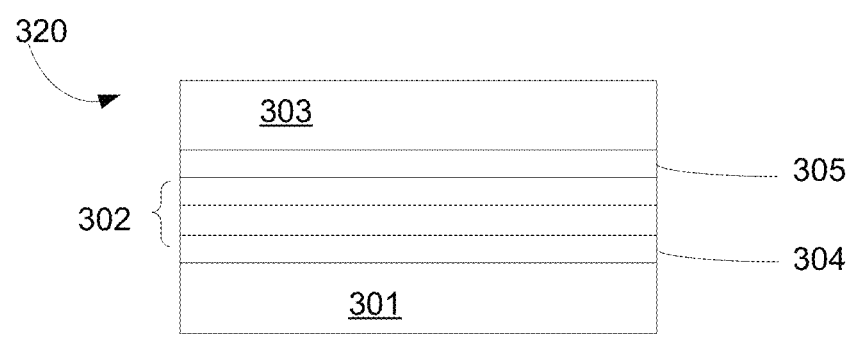

FIG. 3C depicts another illustrative device 320 that includes a substrate 301, a multilayer gas barrier layer 302 and a wear resistant layer 303, configured as described in FIGS. 3A and 3B. The device 320 may also include an optional substrate adhesion layer 304. The device 320 may also include an optional wear resistant adhesion layer 305. It should be noted that the optional wear resistant adhesion layer 305 can be included in a device without the optional substrate adhesion layer 304, even though that particular configuration is not specifically depicted herein. The optional wear resistant adhesion layer 305 can be positioned between the wear resistant layer 303 and the multilayer gas barrier layer 302. The optional wear resistant adhesion layer 305 can function to improve the adhesion between the multilayer gas barrier layer 302 and the wear resistant layer 305. Properties of the wear resistant adhesion layer 305 can depend, at least in part, on the materials of the underlying multilayer gas barrier layer 302 and the overlying wear resistant layer 303.

The optional adhesion layers (e.g., substrate adhesion layers, wear resistant adhesion layers, or both) can have various thicknesses. In some embodiments, optional adhesion layers can have thicknesses of not less than 0.1 nm, or in some embodiments not less than 0.5 nm. In some embodiments, optional adhesion layers can have thickness of not greater than 10 nm, or in some embodiments not greater than 3 nm.

In some embodiments, optional adhesion layers (e.g., substrate adhesion layers, wear resistant adhesion layers, or both) can include metals, oxides, nitrides, or carbides for example. In some embodiments, optional adhesion layers can include metals such as platinum (Pt), indium (In), chromium (Cr), tin (Sn), yttrium (Y), tantalum (Ta), iridium (Ir), rhodium (Rh), ruthenium (Ru), niobium (Nb), palladium (Pd), nickel (Ni), aluminum (Al), silicon (Si), or combinations thereof. In some embodiments, optional adhesion layers can include oxides such as tantalum oxide (TaO), aluminum oxide (AlO), yttrium oxide (YO), magnesium oxide (MgO), beryllium oxide (BeO), indium oxide (InO), tin oxide (SnO), or combinations thereof. An example of a combination thereof includes indium tin oxide (ITO). It should be noted that oxides can include any stoichiometry including the particular noted element and oxygen. In some embodiments, optional adhesion layers can include nitrides such as titanium nitride (TiN), zirconium nitride (ZrN), chromium nitride (CrN), silicon nitride (SiN), aluminum nitride (AlN), boron nitride (BN), or combinations thereof. In some embodiments, optional adhesion layers can include carbides such as titanium carbide (TiC), zirconium carbide (ZrC), chromium carbide (CrC), silicon carbide (SiC), boron carbide (BC), or combinations thereof. In some embodiments, mixtures of oxides and nitrides (for example) can be utilized. Illustrative examples of such materials include silicon oxy nitride (SiON), chromium oxy nitride (CrON), titanium oxy nitride (TiON), aluminum oxy nitride (AlON), titanium silicon oxy nitride (TiSiON), silicon aluminum oxy nitride (SiAlON), titanium silicon oxy nitride (TiSiON), titanium aluminum oxy nitride (TiAlON), chromium aluminum oxy nitride (CrAlON), chromium silicon oxy nitride (CrSiON), or combinations thereof for example. In some embodiments, optional adhesion layers can include TaO, AlO, or YO for example.

Optional adhesion layers can have a substantially homogeneous composition or can have a composition that changes from one major surface (e.g., the surface in contact with a gas barrier layer in a wear resistant adhesion layer) to the opposing major surface (e.g., the surface in contact with the wear resistant layer in a wear resistant adhesion layer). For example, an optional adhesion layer can have a compositional gradient from one major surface to the other major surface. In some embodiments, an optional adhesion layer can have a compositional gradient that can change from the major component being a material that is compatible with (or is even the same as) the gas barrier layer (for example the surface in contact with a gas barrier layer) to the major component being a material that is compatible with (or is even the same as) the wear resistant layer (for example the surface in contact with the wear resistant layer). In some embodiments, an optional adhesion layer can have a compositional gradient such that the material from the gas barrier layer increases in concentration across the adhesion layer from the interface with the wear resistance layer to the interface with the gas barrier layer.

Figure 3D:
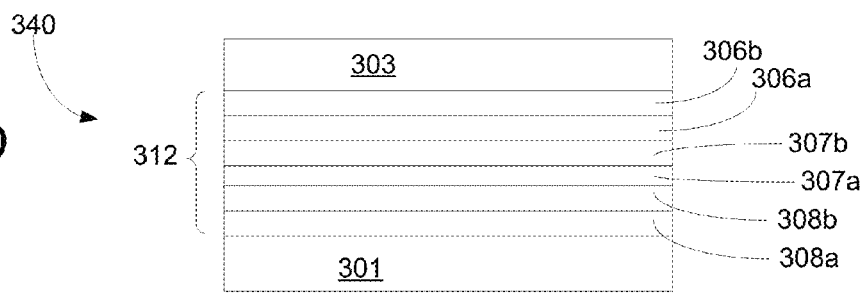

FIG. 3D depicts a cross section of a portion of a device 340 that includes a multilayer gas barrier layer 312 positioned between a substrate 301 and a wear resistant layer 303. It should be noted that optional adhesion layers (e.g., a substrate adhesion layer, a wear resistant adhesion layer, or both) can also be included in the device 340, even though not depicted in this figure. The multilayer gas barrier layer 312 includes a plurality of individual sublayers. The particular embodiment depicted includes three sets of sublayers, a first gas barrier sublayer 306a and a second gas barrier sublayer 306b, a first gas barrier sublayer 307a and a second gas barrier sublayer 307b, and a first gas barrier sublayer 308a and a second gas barrier sublayer 308b. Disclosed devices can include any number of sets of sublayers, where a set of sublayers includes two individual sublayers. In some embodiments, disclosed devices can include at least two sets of sublayers, at least three sets of sublayers, at least 8 sets of sublayers, and in some embodiments ten (10) sets of sublayers. In some embodiments, disclosed devices can include not more than 100 sets of sublayers for example. The sublayers in a multilayer gas barrier layer that includes multiple sets of sublayers may have properties and be made of materials such as those discussed above.

Disclosed device also include a NFT. In some embodiments, a NFT can be made of a plasmonic material. Illustrative NFT materials can include plasmonic materials such as gold (Au), silver (Ag), aluminum (Al), copper (Cu), ruthenium (Ru), rhodium (Rh), iridium (Ir), or alloys thereof; titanium nitride (TiN), zirconium nitride (ZrN), or combinations thereof; thermally conductive oxides; indium tin oxide (ITO); and combinations thereof. In NFTs made of materials having relatively low oxidation resistance (e.g., Rh, TiN, ZrN, etc.), oxidation of the NFT may lead to loss of functionality of the NFT. In such embodiments, gas barrier properties become even more important. In some embodiments, illustrative NFT materials can also include those disclosed in U.S. Patent Publication No. 2013/0286799, U.S. Pat. No. 8,427,925, and U.S. patent application Ser. No. 13/923,925 entitled MAGNETIC DEVICES INCLUDING FILM STRUCTURES, filed on Jun. 21, 2013, and U.S. Ser. No. 14/062,651 entitled RECORDING HEADS INCLUDING NFT AND HEATSINK, filed on Oct. 24, 2013, the disclosures of which are incorporated herein by reference thereto.

Disclosed device also include a wear resistant layer. In some embodiments a wear resistance layer can function to protect the underlying structures and provide wear resistance to the material making up the underlying structure (or structures). Wear resistant layers can have various thicknesses. In some embodiments, wear resistant layers can have thicknesses of not less than 0.2 nanometers (nm), or in some embodiments not less than 0.5 nm. In some embodiments, wear resistant layers can have thickness of not greater than 20 nm, or in some embodiments not greater than 5 nm.

Illustrative types of materials that can be utilized in disclosed wear resistance layers can include, for example carbon containing materials, magnetic materials, molecular materials, and oxides such as tantalum oxide.

In some embodiments, the wear resistant layer can include a carbon containing material. Illustrative carbon containing materials includes, for example diamond like carbon (DLC), amorphous carbon, carbon nitride, metal containing amorphous carbon, tetrahedral amorphous carbon, hydrogen containing amorphous carbon (a-C:H), or combination thereof.

In some embodiments, the wear resistant layer can include magnetic materials. One class of magnetic materials that can be utilized in wear resistance layers can includes mixtures of ferromagnetic materials and insulating materials. There are two subclasses of such materials mixtures of ferromagnetic materials and oxides and mixtures of ferromagnetic materials and de-coupled grains. Specific types of mixtures of ferromagnetic materials and oxides can include, for example, cobalt (Co) doped titanium oxide (TiO), and iron cobalt (FeCo) doped yttrium oxide ($Y_2O_3$). Specific types of mixtures of ferromagnetic materials and de-coupled grains can include, for example, cobalt platinum (CoPt) doped carbon (C), silicon dioxide ($SiO_2$), and alumina ($Al_2O_3$).

Another class of magnetic materials that can be utilized as wear resistant layers can include semiconductors doped with magnetic materials. Specific types of such materials can include, for example, cobalt (Co), nickel (Ni), iron (Fe), or chromium (Cr) doped titanium oxide ($TiO_x$); Co or manganese (Mn) doped zinc oxide (ZnO); Fe or Mn doped tin oxide ($SnO_x$); Fe or Mn doped indium oxide ($In_2O_3$), chromium oxide ($CrO_2$), or europium oxide (EuO); and magnetic nitrides such as chromium aluminum nitride (CrAlN), gallium chromium nitride (GaCrN), gallium vanadium nitride (GaVN), and indium vanadium nitride (InVN). In some embodiments, materials of this class that could be used could have relatively high coercivity in order to be magnetically hard.

Another class of magnetic materials that can be utilized as wear resistant layers can include ferrites. Specific types of such materials can include, for example, barium ferrites ($BaFe_xO_y$) such as $BaFe_{12}O_{19}$, strontium ferrites ($SrFe_xO_y$), and cobalt ferrites ($CoFe_xO_y$). In some embodiments, strontium ferrites ($SrFe_xO_y$) can be utilized in overcoats as disclosed herein.

Another class of magnetic materials that can be utilized as wear resistant layers can include two phase materials. Two phase materials can include, for example, ferromagnet/insulator materials or paramagnet/insulator materials. Specific types of such materials can include, for example, cobalt (Co), iron (Fe), nickel (Ni) or their alloys dispersed in an alumina ($Al_2O_3$), silica ($SiO_2$), or carbon (C) matrix.

Another class of magnetic materials that can be utilized as wear resistant layers can include atomic level sublayers or multilayers. The sublayers or multilayers can include both ferromagnet material/insulator material and paramagnet material/insulator material. Specific types of such materials can include, for example, atomic level sublayers or multilayers of cobalt (Co), iron (Fe), or nickel (Ni) with alumina ($Al_2O_3$), silica ($SiO_2$) or carbon (C). Graded layers can also be utilized as wear resistant layers. Specific types of such materials can include, for example, graded layers of cobalt (Co), iron (Fe), or nickel (Ni) with alumina ($Al_2O_3$), silica ($SiO_2$) or carbon (C).

Partially oxidized ferromagnetic or ferrimagnetic materials are magnetic materials that can also be utilized in wear resistant layers. Specific types of such materials can include, for example, FeCoO, and $Fe_xO_y$. In some embodiments, materials of this class that could that would be used would have relatively high Curie temperature (Tc) in order to be magnetically hard.

Another class of magnetic materials that can be utilized as overcoats includes exotic materials. Specific types of such materials can include, for example, manganese (Mn) doped indium antimony (InSb), and cobalt (Co) doped titanium antimony (TiSb). In some embodiments, materials of this class that could be used would have relatively high Curie temperature (Tc), for example at least about 400° C.

Wear resistant layers including magnetic materials can also be formed by deposition of a metal layer (via chemical vapor deposition or atomic layer deposition for example) followed by oxidation in order to produce a ferromagnetic/ferrimagnetic oxide. Types of oxidation that can be utilized herein can include, for example, natural oxidation, radical shower oxidation, ultraviolet (UV) light assisted oxidation, ion beam oxidation, or oxygen plasma oxidation. In some embodiments where an atomic layer deposition process is utilized, a stoichiometric oxide can be formed using a precursor, which can provide a metal cation, and another precursor, which provides an oxygen anion. Specific materials that can be utilized herein can include, for example, $BaFe_{12}O_{19}$, $CrO_2$, $\gamma\text{-}Fe_2O_3$, $CoFe_2O_4$ and $Fe_3O_4$. Multilayers or composites including such materials can be utilized. In addition, Fe, Co or Ni may be added to the multilayers or composites in order to affect the magnetic properties of the overcoat material. Ferromagnetic epitaxial growth layers may also be used to obtain a desired oxide phase, while still maintaining magnetic exchange to the underlying head or media layer. A carbon layer may also be modified to make it more magnetically permeable by the addition of Fe, Co, Ni, or a combination thereof for example.

In some embodiments, wear resistant layers can also include molecular materials. Molecular materials include molecules as opposed to atoms (i.e., carbon atoms as in diamond like carbon (DLC)). Molecules are most generally described as electrically neutral groups of atoms that are held together by covalent bonds. In some embodiments, disclosed molecular wear resistant layers can include carbon-nitrogen bonds. In some embodiments, disclosed molecular wear resistant layers can include polymers that include carbon-nitrogen bonds. Illustrative polymers can include, polyimides, polyamides, polyamideimides, polybenzimidazoles, polyetherimides, polyurethanes, polyetherketones, polyetheretherketones, and polytestrafluorethylenes, for example. In some embodiments, polyamides or polyimides can be utilized in molecular wear resistant layers. Polyimides, as a group, are known to have excellent thermal stability, i.e., greater than 400° C. Polyimides can be utilized in wear resistant layers in three different ways, by depositing the polymer, by depositing an intermediate of a polyimide, or by depositing starting materials of a polyimide or an intermediate. One method of forming a polyimide is the reaction of a dianhydride and a diamine. Illustrative dianhdyrides that have desirable vapor pressures can include, for example pyromellitic dianhydride, cyclobutanetetracarboxylic dianhydride, cyclopentane tetracarboxylic dianhydride, bis(dicarboxyphenyl)hexafluoropropane dianhydride, ethylene tetracarboxylic dianhydride, trimellitic anhydride, tetrafluorophthalic anhydride, and phthalic anhydride. Ethylene tetracarboxylic dianhydride may have drawbacks in manufacturing processes because of its relative instability. Compounds like trimellitic anhydride, tetrafluorophthalic anhydride and phthalic anhydride may be useful in situations where the polymer is desired to be limited to a trimer. Illustrative diamines that have desirable vapor pressures can include, for example ortho-, meta-, or para-phenylene diamine, ortho-, meta-, or para-xylene diamine, oxydiphenylene diamine, aminobenzylamines, bis(trifluoromethyl)biphenyldiamine, tetrafluoro phenylene diamine, and bis(aminomethyl)-cyclohexanes. A particularly illustrative polyimide is KAPTON® from DuPont.

In some embodiments, wear resistant layers can also include oxides, such as tantalum oxide for example. The formula of tantalum oxide or tantalum oxides can be given as $Ta_yO_x$ with x and y being a number (integer or otherwise). In some embodiments, y can range from 1 or 2; and x can be range from 2 to 5. In some embodiments, y can be 1 or 2; and x can be an integer from 2 to 5. Tantalum oxide exists in various forms, depending on the oxidation state of the tantalum. Tantalum oxide can be described as being tantalum rich (x is higher than y, i.e., fractionally higher) or oxygen rich (y is higher than x, i.e., fractionally higher). Tantalum oxide can also exist as $Ta_2O_5$, $TaO_2$, $Ta_2O_3$, or combinations thereof. The phrase "tantalum oxide", when used herein can refer to a single form of tantalum oxide or multiple forms of tantalum oxide. $Ta_2O_5$ can be referred to as tantalum pentoxide, tantalum (V) oxide, or ditantalum pentoxide. $TaO_2$ can be referred to as tantalum dioxide, or tantalum (IV) oxide. $Ta_2O_3$ can be referred to as ditantalum trioxide, or a suboxide of tantalum. Disclosed wear resistant layers can also include tantalum in addition to one or more forms of tantalum oxide.

While the present disclosure is not so limited, an appreciation of various aspects of the disclosure will be gained through a discussion of the examples provided below.

EXAMPLES

In this example, two sublayers, 10 Å TaO/30 Å SiO and 10 Å AlO/30 Å SiO, were examined as a multilayer gas barrier. The gas barrier property of the two sublayers and the corresponding single gas barrier layers, 40 Å SiO, 40 Å TaO, and 40 Å AlO, on HAMR head magnetic pole were tested by annealing the HAMR heads with different sublayer and single layer gas barrier layer at 280° C. for 0.5-16.5 hr. For all heads, a 15 Å DLC capping layer was added on the top of the noted layer(s) to provide mechanical protection for the heads. Scanning electron microscopy (SEM) was used to evaluate the pole corrosion.

Table 1 below summarizes the pole oxidation results for the different gas barrier layers. It was found that all dual layer gas barrier layers out perform their corresponding single layer gas barrier layers. Heads with 40 Å TaO showed the worst gas barrier property and showed 100% pole oxidation after being annealed at 280° C. for 1 h. Heads with gas barrier layer of 40 Å SiO and 40 Å AlO showed similar gas barrier property, 100% pole surface pitting after being annealed at 280° C. for 9.5 h.

The heads with sublayer gas barrier layers of 10 Å TaO/30 Å SiO and 10 Å AlO/30 Å SiO showed 100% pole oxidation after being annealed at 280° C. for 16.5 h. As compared with the single 40 Å TaO, 40 Å SiO, and 40 Å AlO layer, the sublayer gas barrier layers 10 Å TaO/30 Å SiO improved pole oxidation life time by 16.5 times, 1.7 times, and 1.7 times, respectively.

Figure 4:
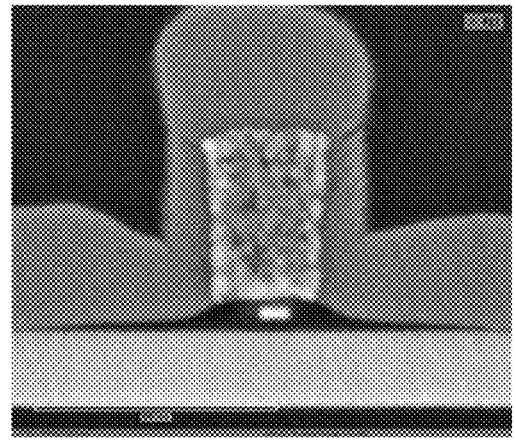
FIG. 4 shows a typical SEM image for the head with 50 Å TaO/15 Å DLC HOC and tested at 280° C. for 1 h
Figure 5A:
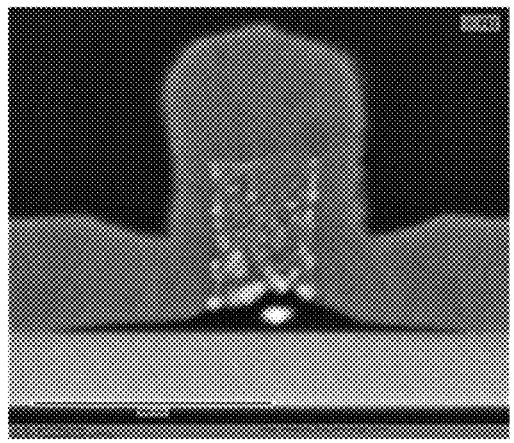
FIGS. 5A to 5D show typical SEM images for the heads with 40 Å SiO/15 Å DLC (FIG. 5A), 40 Å AlO/15 Å DLC (FIG. 5B), 10 Å TaO/30 Å SiO/15 Å DLC (FIG. 5C), and 10 Å AlO/30 Å SiO/15 Å DLC HOC (FIG. 5D) tested at 280° C. for 9.5 h.
Figure 5B:
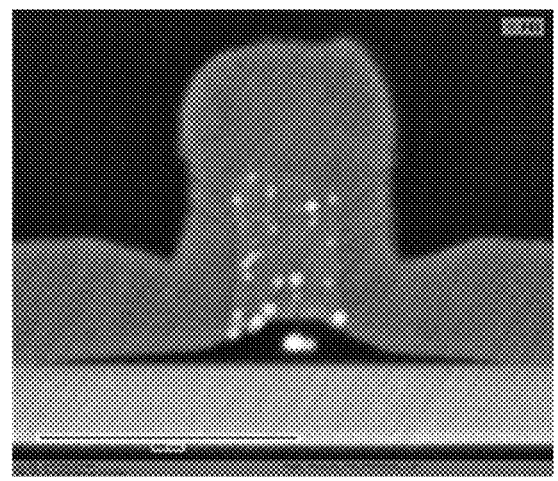
Figure 5C:
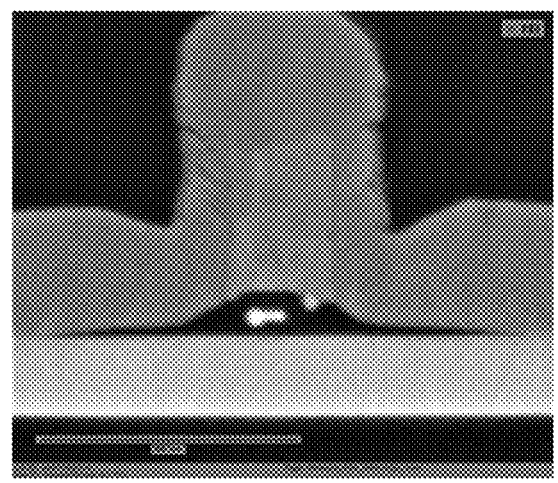
Figure 5D:
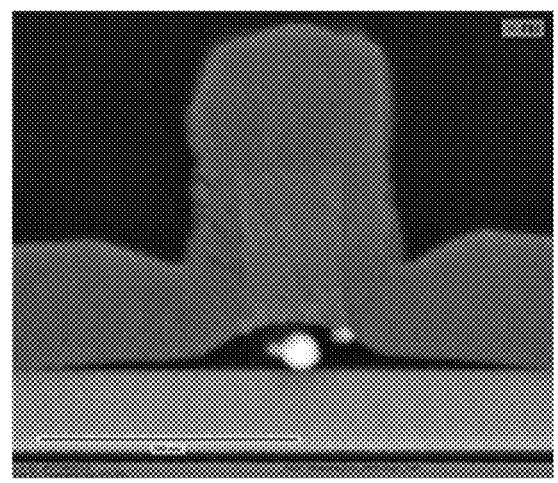

FIG. 4 shows a typical SEM image for the head with 50 Å TaO/15 Å DLC HOC and tested at 280° C. for 1 h, which show serious pole oxidation. FIGS. 5A to 5D show typical SEM images for the heads with 40 Å SiO/15 Å DLC (FIG. 5A), 40 Å AlO/15 Å DLC (FIG. 5B), 10 Å TaO/30 Å SiO/15 Å DLC (FIG. 5C), and 10 Å AlO/30 Å SiO/15 Å DLC HOC (FIG. 5D) tested at 280° C. for 9.5 h. As shown, after annealed at 280° C. for 9.5 h, all heads with 40 Å SiO/15 Å DLC and 40 Å AlO/15 Å DLC HOC showed pitting over the entire pole surface; 96.2% of the heads with 10 Å AlO/30 Å SiO/15 Å DLC HOC showed minor pole edge or pitting corrosion; only 19.3% of the heads with 10 Å TaO/30 Å SiO/15 Å DLC HOC showed minor pole edge or pitting corrosion.

TABLE 1

| Layers | 280° C./ 0.5 H | Failure mode | 280° C./ 1 H | Failure mode | 280° C./ 1.5 H | Failure mode | 280° C./ 4.5 H | Failure mode | 280° C./ 9.5 H | Failure mode | 280° C./ 16.5 H | Failure mode |
|---|---|---|---|---|---|---|---|---|---|---|---|---|
| 40Å TaO/ 15 Å DLC | 63.00 | Edge/ pitting | 100 | Pitting | | | | | | | | |
| 40 Å SiO/ 15 Å DLC | 0.00 | | 0 | | 0 | | 12.3 | Edge | 100 | Pitting | | |
| 40 Å AlO/ 15 Å DLC | 0.00 | | 0 | | 0 | | 13.8 | | 100 | Pitting | | |
| 10 Å TaO/ 30 Å SiO/ 15 Å DLC | 0 | | 0 | | 0 | | 0 | | 19.3 | Edge/ pitting | 100 | Edge/ pitting |
| 10 Å AlO/ 30 Å SiO/ 15 Å DLC | 0 | | 0 | | 0 | | 26.3 | Edge | 96.23 | Edge/ pitting | 100 | Full coverage |

An illustrative embodiment of a device disclosed herein can include from the bottom (NFT) to the top (wear resistance layer): a gold (Au) peg/AlO, for example a 1 nm layer/TaO, for example a 1 nm layer/SiO, for example a 1 nm layer/TaO, for example a 1 nm layer/DLC wear resistance layer. In such a device, the AlO next to the peg is utilized to improve adhesion of the peg to the multilayer gas barrier layer. In such a device, the TaO/SiO/TaO can be considered the multilayer gas barrier layer.

Another illustrative embodiment of a device disclosed herein can include from the bottom (NFT) to the top (wear resistance layer): a gold (Au) peg/AlO, for example a 1 nm layer/TaO, for example a 1 nm layer/CrO, for example a 1 nm layer/TaO, for example a 1 nm layer/DLC wear resistance layer. In such a device, the AlO next to the peg is utilized to improve adhesion of the peg to the multilayer gas barrier layer. In such a device, the TaO/CrO/TaO can be considered the multilayer gas barrier layer.

An illustrative embodiment of a device disclosed herein can include from the bottom (NFT) to the top (wear resistance layer): a rhodium (Rh) peg/SiO, for example a 1 nm layer/TaO, for example a 1 nm layer/SiO, for example a 1 nm layer/TaO, for example a 1 nm layer/DLC wear resistance layer. In such a device, the SiO next to the peg is utilized to improve adhesion of the peg to the multilayer gas barrier layer. In such a device, the TaO/SiO/TaO can be considered the multilayer gas barrier layer.

Another illustrative embodiment of a device disclosed herein can include from the bottom (NFT) to the top (wear resistance layer): a rhodium (Rh) peg/CrO, for example a 1 nm layer/TaO, for example a 1 nm layer/CrO, for example a 1 nm layer/TaO, for example a 1 nm layer/DLC wear resistance layer. In such a device, the CrO next to the peg is utilized to improve adhesion of the peg to the multilayer gas barrier layer. In such a device, the TaO/CrO/TaO can be considered the multilayer gas barrier layer.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of devices including at least one multilayer gas barrier layer are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device comprising:
    a near field transducer (NFT);
    a multilayer gas barrier layer positioned on at least a portion of the NFT,
       the multilayer gas barrier layer comprising at least a first and a second sublayer, where the second gas barrier sublayer is positioned on the first gas barrier sublayer, the first gas barrier sublayer is positioned adjacent the NFT and the second gas barrier sublayer is positioned adjacent the wear resistant layer, the first and second sublayers independently have thicknesses from 0.01 nm to 5 nm; and
    a wear resistance layer positioned on at least a portion of the gas barrier layer.

2. The device according to claim 1, wherein the first and second sublayers are made of the same material.

3. The device according to claim 1, wherein the first and second sublayers are made of different materials.

4. The device according to claim 1, wherein the first and second sublayers independently comprise oxides, nitrides, carbides, silicides, borides, fluorides, metals, or combinations thereof.

5. The device according to claim 1, wherein the first and second sublayers independently comprise tantalum oxide (TaO), chromium oxide (CrO), or combinations thereof.

6. The device according to claim 1, wherein the first and second sublayers independently comprise titanium aluminum oxide (TiAlO), tantalum aluminum oxide (TaAlO), tantalum silicon oxide (TaSiO), titanium aluminum silicon oxide (TiAlSiO), or combinations thereof.

7. The device according to claim 1, wherein the first and second sublayers independently comprise aluminum nitride (AlN), tantalum nitride (TaN), or some combination thereof.

8. The device according to claim 1, wherein the first and second sublayers independently comprise titanium aluminum nitride (TiAlN), titanium silicon nitride (TiSiN), aluminum silicon nitride (AlSiN), tantalum silicon nitride (TaSiN), tantalum aluminum nitride (TaAlN), carbon silicon nitride (CSiN), titanium aluminum silicon nitride (TiAlSiN), or combinations thereof.

9. The device according to claim 1, wherein the first and second sublayers independently comprise one or more fluorides.

10. The device according to claim 1, wherein the first and second sublayers independently comprise chromium fluoride (CrF$_2$), magnesium fluoride (MgF$_2$), silicon fluoride (SiF), or combinations thereof.

11. The device according to claim 1, wherein the first and second sublayers independently comprise one or more borides.

12. The device according to claim 1, wherein the first and second sublayers independently comprise titanium boride (TiB$_2$), chromium boride (CrB), zirconium boride (ZrB), or combinations thereof.

13. The device according to claim 1, wherein the first and second sublayers independently comprise silicon aluminum oxy nitride (SiAlON), titanium silicon oxy nitride (TiSiON), titanium aluminum silicon oxy nitride (TiAlSiON), tantalum silicon oxy nitride (TaSiON), titanium aluminum oxy nitride (TiAlON), tantalum aluminum oxy nitride (TaAlON), tantalum oxy nitride (TaON), or combinations thereof.

14. The device according to claim 1, wherein the first and second sublayers independently comprise titanium (Ti), chromium (Cr), niobium (Nb), hafnium (Hf), nickel (Ni), zirconium (Zr), or combinations thereof.

15. The device according to claim 1 further comprising a NFT adhesion layer and a wear resistance adhesion layer, wherein the NFT adhesion layer is positioned between the NFT and the multilayer gas barrier layer and the wear resistance adhesion layer is positioned between the multilayer gas barrier layer and the wear resistance layer.

16. A device comprising:
a near field transducer (NFT);
a multilayer gas barrier layer positioned on at least a portion of the NFT,
the multilayer gas barrier layer comprising at least a first and a second sublayer, where the second gas barrier sublayer is positioned on the first gas barrier sublayer, the first gas barrier sublayer is positioned adjacent the NFT and the second gas barrier sublayer is positioned adjacent the wear resistant layer, the first and second sublayers independently comprise a fluoride or a metal; and
a wear resistance layer positioned on at least a portion of the gas barrier layer.

17. The device according to claim 16, wherein the first and second sublayers independently have thicknesses from 0.01 nm to 5 nm.

18. The device according to claim 16, wherein the first and second sublayers independently comprise chromium fluoride (CrF$_2$), magnesium fluoride (MgF$_2$), silicon fluoride (SiF), or combinations thereof.

19. The device according to claim 16, wherein the first and second sublayers independently comprise titanium (Ti), chromium (Cr), niobium (Nb), hafnium (Hf), nickel (Ni), zirconium (Zr), or combinations thereof.

20. A device comprising:
a near field transducer (NFT);
a multilayer gas barrier layer positioned on at least a portion of the NFT,
the multilayer gas barrier layer comprising at least a first and a second sublayer, where the second gas barrier sublayer is positioned on the first gas barrier sublayer, the first gas barrier sublayer is positioned adjacent the NFT and the second gas barrier sublayer is positioned adjacent the wear resistant layer, the first and second sublayers independently comprise a fluoride or a metal;
a wear resistance layer positioned on at least a portion of the gas barrier layer; and
a NFT adhesion layer positioned between the multilayer gas barrier layer and the NFT.

* * * * *